United States Patent [19]

Stewart et al.

[11] Patent Number: 5,432,872
[45] Date of Patent: Jul. 11, 1995

[54] LIGHT ENERGY BROADENING COUPLER

[75] Inventors: William J. Stewart, Blakesly; Jens Buus, both of Gayton, England

[73] Assignee: GEC-Marconi Limited, United Kingdom

[21] Appl. No.: 183,523

[22] Filed: Jan. 19, 1994

[30] Foreign Application Priority Data

Jan. 20, 1993 [GB] United Kingdom ............... 9301052

[51] Int. Cl.⁶ .................................................. G02B 6/26
[52] U.S. Cl. ...................................... 385/15; 385/27; 385/42; 385/49; 385/129; 385/131
[58] Field of Search ................. 385/15, 24, 27, 39, 385/41, 42, 46, 48, 49, 50, 51, 129, 130, 131, 132

[56] References Cited

U.S. PATENT DOCUMENTS

| | | | |
|---|---|---|---|
| 4,113,345 | 9/1978 | Gerndt | 385/46 X |
| 4,483,583 | 11/1984 | Ungeri | 385/42 X |
| 4,811,351 | 3/1989 | Matsui et al. | 372/50 |
| 5,048,905 | 9/1991 | Fejer et al. | 385/130 X |
| 5,121,452 | 6/1992 | Stowe et al. | 385/46 |
| 5,140,655 | 8/1992 | Bergmann | 385/46 |
| 5,175,779 | 12/1992 | Mortimore | 385/43 |
| 5,175,782 | 12/1992 | Bowen et al. | 385/46 X |

FOREIGN PATENT DOCUMENTS

| | | | |
|---|---|---|---|
| 0465425 | 1/1992 | European Pat. Off. | 385/129 X |
| 0482461 | 4/1992 | European Pat. Off. | 385/129 X |
| 3839916 | 5/1990 | Germany | 385/129 X |
| 2096790 | 10/1982 | United Kingdom | 385/129 X |
| 2190512 | 11/1987 | United Kingdom | 385/129 X |

*Primary Examiner*—Brian Healy
*Attorney, Agent, or Firm*—Kirschstein, Ottinger, Israel & Schiffmiller

[57] ABSTRACT

An optical device comprising an optical waveguide (13) on a substrate (11) which over part of its length forms one of a stack (15) of coupled optical waveguide sections of the same length, the stack being of a length such that a light wave of predetermined frequency propagating along the waveguide (13) to enter the stack (15) at one end thereof produces light waves at the other end of the stack which are substantially in phase adjacent each waveguide section. The device finds particular application for coupling light from a substrate waveguide into another waveguide, e.g. an optical fibre (27), off the substrate (11).

8 Claims, 2 Drawing Sheets

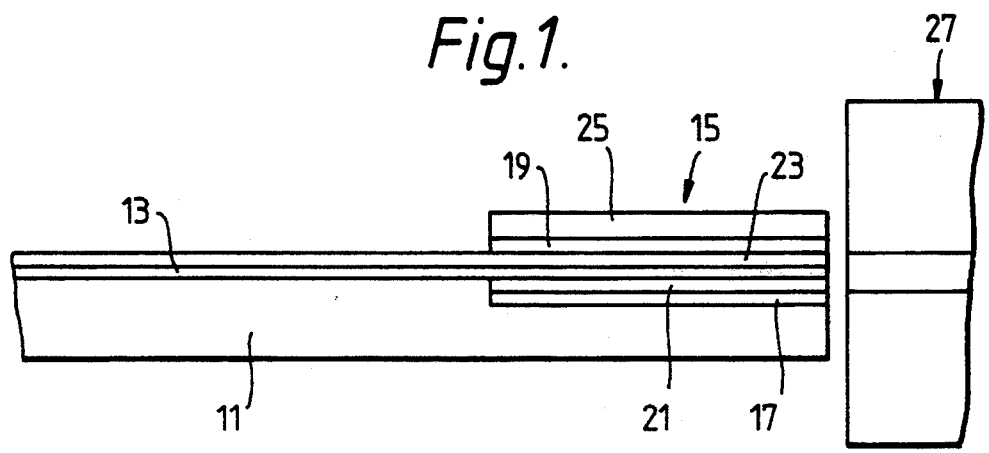
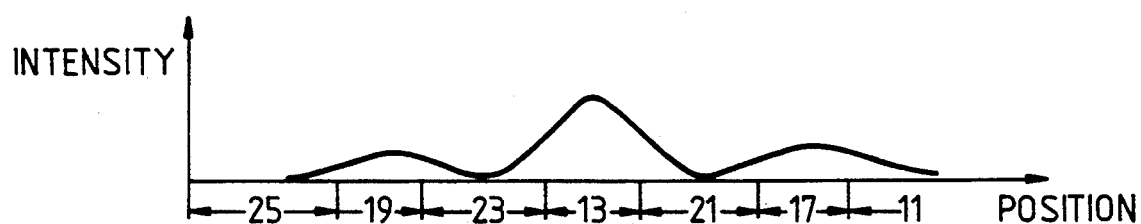
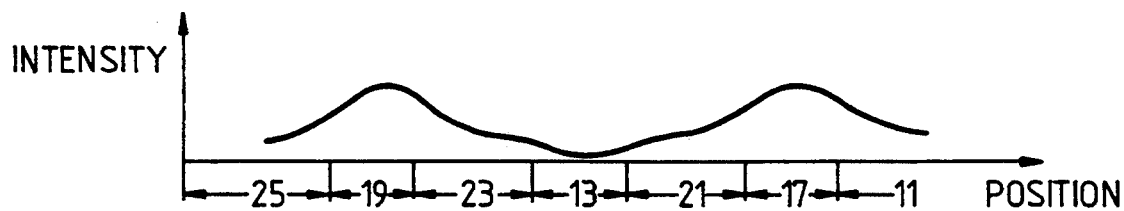

LIGHT ENERGY BROADENING COUPLER

BACKGROUND OF THE INVENTION

This invention relates to optical devices.

More particularly the invention relates to optical devices suitable for use in coupling a planar optical waveguide formed on a substrate to a waveguide off the substrate, for example, an optical fibre.

Planar optical waveguides fabricated on a substrate in semiconductor material usually have relatively large differences between the refractive indices of the materials forming the waveguide. As a result, strong optical waveguiding is obtained even in structures with relatively thin layers. Indeed if the layers are too thick the waveguides will support more than one guided mode.

The relatively strong waveguiding obtained with thin layers is convenient from a fabrication point of view since growth of very thick structures is avoided. However, a problem arises when light is to be coupled from the waveguide into an optical fibre. The strong guiding in the semiconductor typically leads to spotsize radii of the order of 0.5 to 1.0 μm in contrast to that of fibres which are typically in the range 3 to 6 μm. This leads to tight assembly tolerances and inefficient coupling or necessitates the use of complicated matching optics.

If the wave is al)owed to diverge from the end of the substrate waveguide the spot size can be matched, but the phases of the outer parts of the wave will cause them to cancel the central part and reduce the coupling efficiency drastically.

To overcome this problem in planes parallel to the plane of the substrate, tapering of the waveguide on the substrate can relatively easily be provided. However, tapering in the direction transverse to the plane of the substrate is much more difficult, see for example an article entitled "Tapered waveguide InGa/InGaAsP multiple quantum-well lasers" by V. Koren et al at page 136 of the proceedings of the Integrated Photonics Research Conference, 1989.

SUMMARY OF THE INVENTION

It is an object of the present invention to provide an optical device whereby the above described problem may be alleviated.

According to the invention there is provided an optical device comprising an optical waveguide on a substrate which over part of its length forms one of a stack of coupled optical waveguide sections of the same length, said stack being of a length such that a light wave of predetermined frequency propagating along said waveguide to enter said stack at one end thereof produces light waves at the other end of the stack which are substantially in phase adjacent each waveguide section.

Preferably the waves at said other end of the stack are also of substantially the same amplitude adjacent each waveguide section.

In one particular embodiment of the invention said stack comprises an odd number of waveguide sections and said part of said waveguide constitutes the central section of said stack. In such an arrangement said stack is preferably symmetrical about the central section. Said odd number is conveniently three.

BRIEF DESCRIPTION OF THE DRAWING

One optical device in accordance with the invention will now be described, by way of example, with reference to the accompanying drawing in which:

FIG. 1 is a diagrammatic sectional view of the device;

FIGS. 2(A) and (B) are diagrams illustrating field patterns arising in operation of the device.

DETAILED DESCRIPTION OF THE PREFERRED EMBODIMENT

Figure 3:
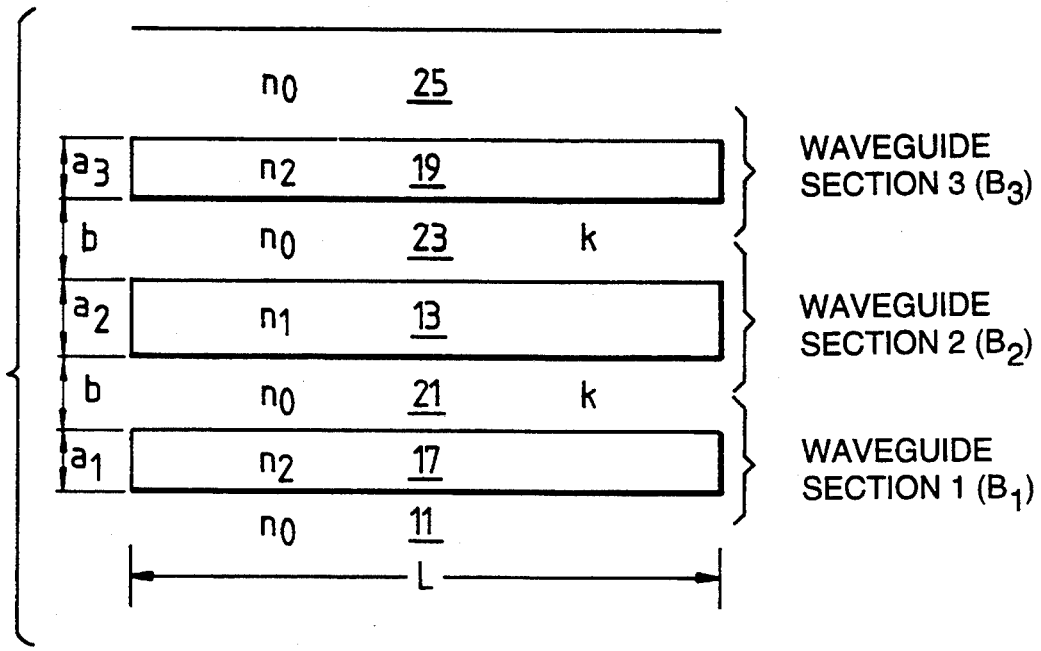
FIGS. 3 and 4 are diagrams for assisting understanding of the principles followed in designing the device of FIG. 1.

Referring to FIG. 1, the device, which serves to couple light propagating along a waveguide into an optical fibre, is formed on a substrate 11. The waveguide incorporates a narrow, straight buried stripe 13 of material which has a higher refractive index than the material of the substrate 11 and extends along the substrate 11 adjacent one of its main faces. Along a part of its length the waveguide forms the central waveguide section of a stack 15 of three parallel waveguide sections which terminate at an edge of the substrate 11. The outer waveguide sections of the stack 15 incorporate two further narrow, straight stripes 17 and 19 of material of higher refractive index than the material of the substrate 11, the two stripes 17 and 19 lying respectively below and above the stripe 13 in a direction normal to the plane of the substrate 11 and being separated therefrom by respective thin layers 21 and 23 of the material of the substrate 11, the upper stripe 19 being overlain by a further layer 25 of the material of the substrate 11.

In operation of the device light propagating along the waveguide incorporating stripe 13 towards the waveguide section stack 15, on reaching the stacks 15, is coupled into the other two waveguide sections of the stack 15. As further explained below, the stack 15 is designed so that at the end of the stack 15 opposite to that at which the waveguide incorporating the stripe 13 enters the stack 15, i.e. at the edge of the substrate 11, the waves adjacent the three waveguide sections are in phase. The optical fibre 27 into which light is to be coupled is positioned adjacent the end of the stack 15, as shown in FIG. 1. In effect the waveguide sections have a length such that the waves in the two outer waveguide sections of the stack 15 drop a whole $2\pi$ in phase compared with the waves in the central waveguide section of the stack 15, whilst transverse to their lengths the waveguide sections are dimensioned to maintain the field at the required size for efficient coupling. There is a minimum length for the stack 15 for the required field pattern to occur, but thereafter the required pattern repeats periodically down the length of the stack 15.

A theoretical approach to the problem of designing the stack 15 to achieve the best coupling will now be explained.

The approach involves consideration of guided modes 0 and 2 which are excited in the stack 15 and superpose in the stack 15 to give the desired field pattern. The required field intensity distributions of these two modes at the end of the stack 15 adjacent the optical fibre 27 for efficient coupling are illustrated in FIGS. 2A and 2B respectively. As explained below, the antisymmetric mode I is not excited in the stack 15.

The modes 0 and 2 have different propagation constants $\sigma_0$ and $\sigma_2$ in the stack 15 so that, after a distance L equal to $\pi/(\sigma_0-\sigma_2)$, these two modes have slipped in phase relative to one another by 180°, the intensity distributions then being as illustrated in FIG. 2, as required.

The guiding properties of the stack 15 are conveniently analysed using simple coupled mode theory. Referring to FIG. 3, for this purpose the waveguide sections incorporating stripes 17, 13 and 19 are hereafter respectively referred to as waveguide sections 1, 2 and 3. It is first assumed that, considered individually, the three waveguide sections 1, 2 and 3 would support modes with propagation constants $\beta_1$, $\beta_2$ and $\beta_3$ respectively. For simplicity it is assumed that the stack 15 is symmetrical about the central waveguide section 2 so that $\beta_1=\beta_3$, i.e. the waveguide sections 1 and 3 are identical. With the waveguide sections 1, 2 and 3 placed in proximity they become coupled. For simplicity, only nearest neighbour coupling is considered, and for reasons of symmetry, the coupling k between waveguide sections 1 and 2 is the same as the coupling between the waveguide sections 2 and 3.

According to coupled mode theory the modes 0, 1 and 2 in the stack 15 have propagation constants $\sigma_0$, $\sigma_1$ and $\sigma_2$ which are found as the eigenvalues of the matrix $$\begin{pmatrix} \beta_1 & \kappa & 0 \\ \kappa & \beta_2 & \kappa \\ 0 & \kappa & \beta_3 \end{pmatrix} \quad (1)$$

This gives $$\sigma_0 = \frac{\beta_1 + \beta_2}{2} + \frac{1}{2}\sqrt{(\beta_1 - \beta_2)^2 + 8\kappa^2} \quad (2)$$

$$\sigma_1 = \beta_1 \quad (3)$$

$$\sigma_2 = \frac{\beta_1 + \beta_2}{2} - \frac{1}{2}\sqrt{(\beta_1 - \beta_2)^2 + 8\kappa^2} \quad (4)$$

The field distribution is described (to within a normalisation constant) by the corresponding eigenvectors. Element i in eigenvector j corresponds to the amplitude of mode j in waveguide i.

$$E_0 = \left(1, \frac{1}{2\kappa}((\beta_2 - \beta_1) + \sqrt{(\beta_2 - \beta_1)^2 + 8\kappa^2}), 1\right) \quad (5)$$

$$E_1 = (1, 0, -1) \quad (6)$$

$$E_2 = \left(1, \frac{1}{2\kappa}((\beta_2 - \beta_1) - \sqrt{(\beta_2 - \beta_1)^2 + 8\kappa^2}), 1\right) \quad (7)$$

In order to obtain efficient coupling we need a structure where the field at the input is concentrated in waveguide section 2, but at the output it is distributed evenly over all three waveguide sections 1, 2 and 3. This turns out to be achieved for the case where $$\beta_2 - \beta_1 = 2\kappa \quad (8)$$

The input field is described by $$E_{in} = (0,1,0) = \frac{1}{\sqrt{12}}(E_0 - E_2) \quad (9)$$

After propagation through a distance L given by $$L = \pi/(\sigma_0 - \sigma_2) \quad (10)$$

the phase difference between modes 0 and 2 is changed by 180° and the output field becomes $$E_{out} = \frac{1}{\sqrt{12}}(E_0 + E_2) = \frac{1}{\sqrt{12}}(2,2,2) \quad (11)$$

giving the desired even distribution. The propagation distance L can be expressed $$L = \frac{\pi}{2\sqrt{3}\,\kappa} = \frac{\pi}{\sqrt{3}\,(\beta_2 - \beta_1)} \quad (12)$$

Referring to FIG. 3, the design of the stack 15 proceeds as follows. For given values of the thickness $a_2$ and the refractive index $n_1$ of the stripe 13 of the waveguide section 2, and of the refractive index $n_o$ of the material of the substrate 11 and layers 21, 23 and 25, the propagation constant $\beta_2$ can be found. Given a required length L, the value of the propagation constant $\beta_1$ can then be found from equation (12), above. From this the thicknesses $a_1$ and $a_3$ and refractive index $n_2$ of the stripes 17 and 19 can be found. The thickness of layers 21 and 23 can then be chosen so that the coupling coefficient k satisfies equation (8).

It will be appreciated that increasing the number of waveguide sections in the stack 15 from three to five, seven etc., may be expected to improve the best coupling obtainable, but such structures become increasingly complex to design and fabricate, and the improvement in coupling may not be worthwhile.

Figure 4:
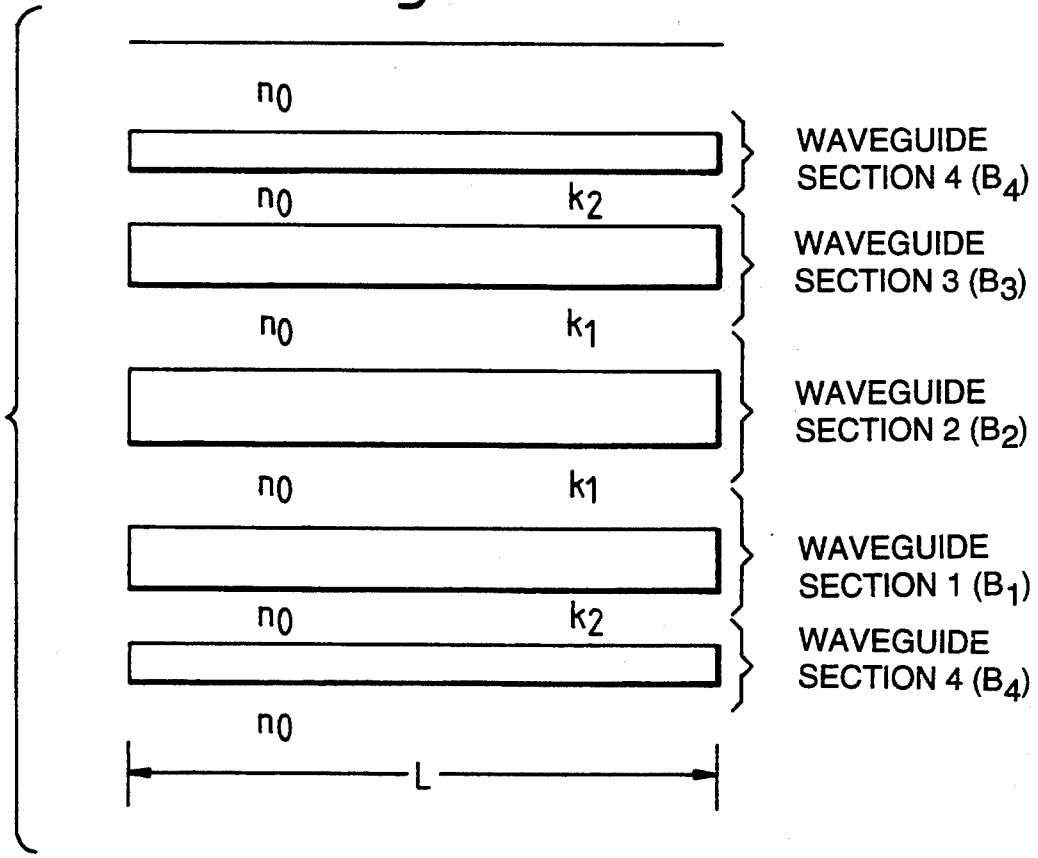

By way of illustration, the symmetrical five waveguide section stack case is considered below, the notation for this being shown in FIG. 4.

In general the propagation constants for the three even modes 0, 2, 4, excited are found by finding the roots of a third order polynomial. If $\beta_3=\beta_1$ one of these roots is easy to find, and if furthermore $$\kappa_1 = (\sqrt{5} + 1)/2\kappa_2 \quad (13)$$

and $$\beta_2 = \beta_1 - (3 + \sqrt{5})\kappa_2 \quad (14)$$

the following propagation constants $\sigma_0$, $\sigma_2$, $\sigma_4$ and field distributions $E_0$, $E_2$, $E_4$ for the even modes may be found $$\sigma_0 = \beta_1 + \kappa_2 \quad (15)$$
$$\sigma_2 = \beta_1 \quad (16)$$
$$\sigma_4 = \beta_1 - (4 + \sqrt{5})\kappa_2 = \beta_2 - \kappa_2 \quad (17)$$

$$E_0 = (1,1,1+\sqrt{5},1,1) \quad (18)$$

$$E_2 = \left( -\frac{5+\sqrt{5}}{4+\sqrt{5}}, 0, \frac{2\sqrt{5}}{4+\sqrt{5}}, 0, -\frac{5+\sqrt{5}}{4+\sqrt{5}} \right) \quad (19)$$

$$E_4 = \left( \frac{1}{4+\sqrt{5}}, -1, \frac{1+\sqrt{5}}{4+\sqrt{5}}, -1, \frac{1}{4+\sqrt{5}} \right) \quad (20)$$

The input field $E_{in}$ is concentrated in the centre where $$E_{in} = E_0 + E_2 + E_4 = (0,0,2\sqrt{5},0,0) \quad (21)$$

By changing the phase of modes 2 and 4 by 180° we get $$E_{out} = E_0 - E_2 - E_4 = (2,2,2,2,2) \quad (22)$$

In order to get the required phase change the length L must satisfy $$(\sigma_0 - \sigma_2)L = N\pi \text{ and } (\sigma_0 - \sigma_4)L = M\pi \quad (23)$$

where N and M are both odd integers. For M=7 and a length L given by $$\kappa_2 L = \frac{7\pi}{5+\sqrt{5}} = 0.97\pi \quad (24)$$

the second condition in (23) is satisfied and the first is very nearly satisfied (N=0.97 instead of 1). Since the expressions for the propagation constants contain irrational numbers it is not possible to satisfy both conditions exactly. In the more general case (i.e. $B_3 = B_1$) it will be possible to satisfy these conditions but the expressions for the propagation constants and field distributions become considerably more complicated.

It is pointed out that whilst the devices described above, by way of example, employ stacks of waveguide sections of symmetrical form, this is not necessarily the case in a device in accordance wit the invention. Thus, a design in which the waveguide via which light enters the stack is on one side of the stack may be envisaged.

In such an arrangement it is possible for the stack to comprise an overlay structure on the substrate waveguide. This will facilitate fabrication of the stack, although design becomes more complex.

It is further pointed out that whilst a device in accordance with the invention finds particular application for coupling light from a substrate waveguide into another waveguide, off the substrate other applications may be envisaged. Thus, the device may find application as a power splitter device, without the use of waveguide bends, and having the feature that the split powers are in phase at the output of the device.

We claim:

1. An optical device comprising an optical waveguide on a substrate which over part of its length forms one of a stack of coupled optical waveguide sections of the same length, said stack being of a length such that a light wave of predetermined frequency propagating along said waveguide to enter said stack at one end thereof produces light waves at the other end of the stack which are substantially in phase adjacent each waveguide section.

2. A device according to claim 1 wherein the waves at said other end of the stack are also of substantially the same amplitude adjacent each waveguide section.

3. A device according to claim 1 wherein said stack comprises an odd number of waveguide sections and said part of said waveguide constitutes the central section of said stack.

4. A device according to claim 3 wherein said stack is symmetrical about the central waveguide section.

5. A device according to claim 4 wherein said odd number is three.

6. A device according to claim 1 wherein said waveguide sections are stacked in a direction substantially perpendicular to the plane of said substrate.

7. A device according to claim 6 wherein said other end of said stack lies at an edge of said substrate and an off-substrate optical waveguide is disposed with one end in register with said other end of said stack so that light exiting said other end of the stack is coupled into said off-substrate waveguide.

8. A device according to claim 7 wherein said off-substrate waveguide is an optical fibre.

* * * * *